United States Patent
Lindemann et al.

(10) Patent No.: US 11,845,244 B2
(45) Date of Patent: *Dec. 19, 2023

(54) INLINE COATED BIAXIALLY ORIENTED POLYETHYLENE FOIL AND METHOD FOR THE PRODUCTION THEREOF

(71) Applicant: BRÜCKNER MASCHINENBAU GmbH, Siegsdorf (DE)

(72) Inventors: Willi Lindemann, Bad Reichenhall (DE); Jan Barth, Siegsdorf (DE); Alois Körber, Reit im Winkl (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,586

(22) Filed: Sep. 15, 2022

(65) Prior Publication Data

US 2023/0025908 A1    Jan. 26, 2023

Related U.S. Application Data

(62) Division of application No. 16/932,129, filed on Jul. 17, 2020, now Pat. No. 11,479,025.

(30) Foreign Application Priority Data

Jul. 19, 2019  (DE) ...................... 10 2019 119 600.0

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/32* (2013.01); *B32B 37/153* (2013.01);
(Continued)

(58) Field of Classification Search
CPC ....... B32B 27/08; B32B 27/32; B32B 37/153; B32B 38/0012; B32B 2038/0028;
(Continued)

(56) References Cited

U.S. PATENT DOCUMENTS

2014/0274633 A1    9/2014  Tilton
2017/0341353 A1    11/2017 Leano et al.

FOREIGN PATENT DOCUMENTS

CN          1185768 A      6/1998
CN        101228026 A      7/2008
(Continued)

OTHER PUBLICATIONS

Search Report for Chinese Application No. 202010693332.8, one page.
(Continued)

*Primary Examiner* — Nathan L Van Sell
(74) *Attorney, Agent, or Firm* — Nixon & Vanderhye P.C.

(57) ABSTRACT

A biaxially oriented polyethylene foil (BOPE) is disclosed having layers (A) to (D), wherein layers (B) to (D) contain biaxially oriented polyethylene and layer (A) contains polyurethane and nanoparticles and has a layer thickness of 25 to 300 nm, layer (B) includes polymers having functional groups which are capable of forming covalent bonds with polyurethane and are directly connected to layer (A), layer (C) has at least a layer thickness of 50% of the total thickness of the foil and layer (D) represents an outer layer of the foil, which contains antiblocking agents.

11 Claims, 2 Drawing Sheets

(51) Int. Cl.
*B32B 37/15* (2006.01)
*B32B 38/00* (2006.01)
*B65D 65/40* (2006.01)
*B65D 65/42* (2006.01)

(52) U.S. Cl.
CPC .......... *B32B 38/0012* (2013.01); *B65D 65/40* (2013.01); *B65D 65/42* (2013.01); *B32B 2038/0028* (2013.01); *B32B 2250/242* (2013.01); *B32B 2255/10* (2013.01); *B32B 2255/26* (2013.01); *B32B 2264/1021* (2020.08); *B32B 2307/518* (2013.01); *B32B 2439/70* (2013.01)

(58) Field of Classification Search
CPC .......... B32B 2250/242; B32B 2255/10; B32B 2255/26; B32B 2264/1021; B32B 2307/518; B32B 2439/70; B32B 2255/205; B32B 2307/7244; B32B 2307/7246; B32B 2307/732; B32B 27/20; B32B 27/40; B32B 7/10; B32B 7/035; B32B 38/0008; B65D 65/40; B65D 65/42; B29D 7/01; C08J 7/0427; C08J 7/048; C08J 2323/06; C08J 2351/06; C08J 2475/04; C08J 7/0423; C08J 7/043; C08J 7/123; B05D 3/002; B29C 55/16; C08K 3/36; C08K 2201/011; C09D 7/61; C09D 175/04
See application file for complete search history.

(56) References Cited

FOREIGN PATENT DOCUMENTS

| | | |
|---|---|---|
| CN | 103476579 A | 12/2013 |
| DE | 10 2005 020 913 | 8/2006 |
| EP | 1 274 574 | 10/2008 |
| JP | 8-120205 | 5/1996 |
| JP | 2006-150981 | 6/2006 |
| JP | 2017-538004 | 12/2017 |
| JP | 2018-522757 | 8/2018 |
| JP | 2020-535037 | 12/2020 |
| WO | 2016/089494 | 6/2016 |
| WO | 2016/196168 | 12/2016 |
| WO | 2019/145442 | 8/2019 |

OTHER PUBLICATIONS

D. Angerbauer, "Oberflachenaktivierung und Funktionalisierung von Polyethylen", Department of Plastic Technology, Montan University Leoben, Processing period: Aug. 1, 2009 to Sep. 1, 2010, 64 pages, with English abstract.
Ebnesajjad, Sina "Plastic Films in Food Packaging, Materials, Technology, and Applications", 413 pages, Elsevier Inc. (2013).
Japanese Office Action with English Machine Translation cited in Patent Application 2020-122541 dated May 10, 2023, four (4) pages.

US 11,845,244 B2

INLINE COATED BIAXIALLY ORIENTED POLYETHYLENE FOIL AND METHOD FOR THE PRODUCTION THEREOF

CROSS REFERENCE TO RELATED APPLICATIONS

This application is a Divisional of U.S. patent application Ser. No. 16/932,129, filed Jul. 17, 2020, now allowed; which claims priority from German (DE) Patent Application 10 2019 119 600.0, filed Jul. 19, 2019, the entire contents of each of which are hereby incorporated by reference.

BACKGROUND

The present invention relates to a biaxially oriented polyetylene foil (BOPE) comprising layers (A) to (D), wherein layers (B) to (D) contain biaxially oriented polyethylene and layer (A) contains polyurethane and nanoparticles and has a layer thickness of 25 to 300 nm, layer (B) comprises polymers having functional groups which are capable of forming covalent bonds with polyurethane and are directly connected to layer (A), layer (C) has at least a layer thickness of 50% of the total thickness of the foil and layer (D) represents an outer layer of the foil, which contains antiblocking agents. The invention further relates to methods for producing such foils.

DESCRIPTION OF RELATED ART

Plastics material foils comprising or consisting of biaxially oriented polyethylene (BOPE foils, also called biaxially stretched polyethylene foils) have been known for a long time, but have hitherto been used only rarely. In the prior art, polyethylene foils are usually produced in a blown, cast or MD stretching process. They have better optical properties and better tensile strength and, after corona treatment, are more printable than other polyethylene foils. BOPE foils are used in particular as inexpensive materials for packaging food.

Mechanical properties, transparency, barrier properties and the like are often important properties when using such polyethylene foils. When packaging air-sensitive and/or water-sensitive objects such as food, pharmaceuticals and the like, good barrier properties are important properties of such foils, particularly with respect to oxygen and water. Good barrier properties result in a longer shelf life of the packaged air-sensitive and/or water-sensitive objects. This is particularly true for food. However, BOPE foils generally have adverse oxygen barrier properties. The oxygen transmission rate (OTR) for foils having a thickness of 20 μm is generally approximately between 2000 and 5000 $cm^3/m^2*d$. Metallised BOPE foils still have values of 200 to 300 $cm^3/m^2*d$, which is insufficient for many applications. Part of the quality assurance provided by the plastics material foil on the packaging is, in numerous foodstuffs, protection against loss of flavour and the prevention of odour-intensive substances from escaping and, in numerous cases, protection against atmospheric oxygen and/or against humidity and/or against moisture loss from the goods. Foils having such properties are also referred to as barrier foils or barrier layer foils. Various measures have been used to improve the barrier properties, such as the monoaxial or biaxial orientation of the polyethylene foils (MOPE or BOPE foils) and the use of coatings which increase the barrier properties, in particular also coating with metals and metal oxides or polymers other than polyethylene.

In addition to the usage properties, specific properties are also required for foils, which allow for cost-effective production. Above all, this includes the condition of the surfaces, which on the one hand have to be smooth enough to allow a closed coating by means of metallisation and the like, but on the other hand have to have a sufficient surface roughness in order to generate enough friction for processing on rolls and so on. Otherwise it would not be possible to produce the foils using the usual high-efficiency production lines at high drive speeds. In order to ensure the printability of the foils, the foil surface must also have specific properties, which include a suitable surface tension.

High-strength foils having excellent barrier properties are known from DE 10 2005 020 913 B3. The advantageous barrier properties and surface properties are due to an additional polyamide-containing layer that is co-extruded. However, these foils are relatively complex to produce and the material costs for the polyamide are high, also because it is used in large quantities. Furthermore, the surface quality of the polyamide layer in particular could be improved in order to achieve better adhesion of the metal or metal oxide layer and to improve the processability when applying a metal layer or metal oxide layer.

SUMMARY

It is therefore the object of the present invention to provide a foil which has advantageous barrier properties, in particular advantageous barrier properties against oxygen and water vapour. Another object is to provide a BOPE foil that can be produced easily and with little effort. In addition, a foil is to be provided which has favourable surface properties. In particular, the foil is intended to promote rapid processing. It is also an object of the present invention to provide a foil which allows improved adhesion of metal layers or metal oxide layers. The BOPE foil is preferably inexpensive to produce.

DETAILED DESCRIPTION

The subject matter of the present invention is a polyethylene foil comprising 4 layers (A) to (D), which are arranged in the order of (A) to (D) (see FIGS. 1 and 2B), in which layers (B) to (D) include biaxially oriented polyethylene and wherein layer (A) comprises polyurethane and nanoparticles and has a layer thickness of 25 to 300 nm, layer (B) comprises polymers having functional groups, which can form covalent bonds with polyurethane and is directly connected to layer (A), layer (C) has at least a layer thickness of 50% of the total thickness of the foil, and layer (D) represents an outer layer of the foil and comprises antiblocking agents.

In addition to good mechanical properties, such foils also have improved barrier properties and improved surface properties. In particular, they form very strong connections with metal layers or metal oxide layers applied to layer (A). Insofar as metal layers are mentioned in the following, metal oxide layers are also always meant, unless stated otherwise or unless the context indicates otherwise.

FIGS. 2A and 2B show a comparison between a conventional biaxially oriented polyethylene foil having a base layer in the centre and an outer layer (skin layer) on both surfaces (FIG. 2A) and the foil according to the invention (FIG. 2B). In the conventional foil according to FIG. 2A, the intermediate layer is the main or base layer. It is the layer that gives the entire foil the mechanical and barrier properties thereof. The two outer layers usually consist of a similar material to the base layer and also contain antiblocking agents. Antiblocking agents are agents that give the surface of the foil increased roughness. When the foil is rolled up, this roughness prevents the front and back from adhering too strongly to one another, which subsequently facilitates unwinding. As a rule, these are solid particles having a size in the micrometre range; 1 to 10 µm are preferred and 1.5 to 5 µm are particularly preferred. The antiblocking agents are generally only introduced into the outer layers so that they do not negatively influence the properties of the base layer.

In the foil according to the invention according to FIG. 2B, layer (C) corresponds to the base layer and layer (D) to the lower outer layer of the conventional foil. Layers (A) and (B) replace the top outer layer. The material of layer (A) (polyurethane) imparts improved barrier properties to the polyethylene foil according to the invention. In addition, the polyurethane surface is extremely smooth (has a very low surface roughness) and has a significantly increased surface tension. If a metal layer is additionally applied to this in order to further increase the barrier properties, it therefore adheres extremely firmly to the polyurethane surface of layer (A). The adhesion of layer (A) to layer (B) is also extremely strong. The printability of layer (A) is also excellent. Layer (A) therefore additionally acts as a primer for the metallisation and printing. Therefore, layer (A) is an outer layer of the foil if the foil is not provided with a metal layer or metal oxide layer.

The nanoparticles give layer (A) sufficient surface roughness despite the high smoothness. Surprisingly, the substitution of the antiblocking particles by nanoparticles leads to the barrier properties of such metal layers being improved. On the one hand, this should be due to the fact that the surface roughness is lower than in the case of conventional foils which have antiblocking agents in the layer on the surface of the foil. In this way a more uniform coating can be obtained. On the other hand, the barrier properties of wound metallised foils also improve. Industrial foils are stored in the form of rolls and made available for further processing. When rolling up, the top and underside of the foil come into contact with each other. In the case of a foil coated with metal on one side, the metal layer comes into contact with the other side of the foil. In the conventional BOPE foil according to FIG. 2A, the metal layer comes in direct contact with antiblocking agents from both sides when it is wound up. In places where the large particles of antiblocking agents face each other directly on both sides of the foil, high pressure is exerted on the foil at this location, which can result in holes (e.g. pinholes), cracks and other defects in the metal layer and reduce the barrier properties thereof. In the foil according to the invention, the particles of the antiblocking agents meet the significantly smaller nanoparticles. This reduces the local pressure and reduces the number of defects and in particular of pinholes in the metal layer. This effect also occurs if layer (D) contains no antiblocking agents. In this case, too, the barrier properties are improved because the smaller nanoparticles produce fewer defects on the metal coating or metal oxide coating than conventional antiblocking agents.

The high smoothness of the polyurethane surface, its high surface tension and also the polyurethane material itself cause strong adhesion of the underside and the top to each other when wound on rolls. When unrolling at the usually high processing speeds, this can result in irregularities in the movement sequence, as a result of which strong forces can act on the foil. This can result in damage to the barrier layers. However, the nanoparticles cause an air layer to form between the surfaces and thus allow the foils to be unwound easily, even at high speeds.

In principle, any type of polyethylene can be used in layers (B) to (D) for the present invention. The properties of the materials and the foil formed can be further adapted by additives to the polyethylenes in order to cause a favourable effect on the processability and/or the properties of the finished foil. For example, the polyethylene can be selected from the group consisting of low density polyethylene (LDPE), linear low density polyethylene (LLDPE), medium density polyethylene (MDPE) and high density polyethylene (HDPE). Information on the properties of polyethylenes can be found in the standard work "Domininghaus; Kunstoffe, Eigenschaften and Anwendungen (Plastics materials, properties and applications)" 6. Edition, 2005. Polyethylene polymers which contain unsaturated olefins other than monomers, such as propylene, can also be used.

The properties of polyethylene which are important for the foils according to the invention and the production methods thereof are influenced by the average molar mass (or the average molecular weight or the number-average molar mass), the molar mass distribution, the density and the type and frequency of side chains of the polyethylene.

LLDPE is preferably used. Compared to other types of polyethylene with the same density, it is characterised by higher rigidity and tensile strength. It also shows higher toughness (for example puncture resistance and dart drop impact strength). Tear breaks due to specks during foil extrusion are very rare or do not occur at all and LLDPE has an advantageous sealability. LLDPE also has a pull-out capability for foils having a minimum thickness of around 5 µm. Furthermore, LLDPE has a high resistance to stress cracking and the foils formed therefrom have advantageous optical properties, in particular the haze is comparatively low and the gloss is high.

For all types of polyethylene used, it is possible to use both polyethylenes having a narrow and also polyethylenes having a broad molecular weight distribution. Polyethylenes having mono-, bi- or trimodal distribution curves can also be used. Typical and preferred values of the weight-average molecular weight (Mw) of the LLDPE are 50,000 to 150,000 g/mol. The LLDPE used particularly preferably has a weight-average molecular weight (Mw) of 69,000 to 100,000 g/mol.

The density of the LLDPE used is preferably 0.90 to 0.95, preferably 0.91 to 0.94 g/cm$^3$. If LDPE is used, the density is preferably 0.916 to 0.925 g/cm$^3$. For MDPE, the preferred density is in the range from 0.926 to 0.940 g/cm$^3$ and HDPE preferably has a density in the range from 0.941 to 0.965 g/cm$^3$. The crystallinity of the polyethylene used is preferably 30 to 70%, particularly preferably 35 to 60%, measured by dynamic differential calorimetry (DSC). The information on crystallinity applies in particular to LLDPE.

In addition to ethylene, LLDPE contains alpha-olefins as co-monomers in varying amounts. LLDPE is preferably used in the present invention, which contains up to 20 wt. %, preferably up to 15 wt. % and most preferably up to 10 wt. % of alpha-olefin monomers, in each case based on the total mass of the LLDPE. Accordingly, the polyethylene used preferably contains at least 80 wt. % of ethylene monomers, particularly preferably at least 85 wt. % and most preferably at least 90 wt. %, in each case based on the total mass of the LLDPE. In principle, all types of alpha-olefins can be used as co-monomers, but they are preferably alpha-olefins with linear side chains. Usually, used as alpha-olefins with side chains that have an even carbon number. They can be linear olefins selected from the group consisting of 1-butene, 1-hexene, 1-octene, 1-decene and 1-dodecene. A linear olefin is preferably selected from the group consisting of 1-hexene, 1-octene and 1-decene. Most preferred are 1-hexene and 1-octene.

A suitable polyethylene is an LLDPE which contains at least 80 wt. % of ethylene monomers and up to 20 wt. % of alpha-olefin monomers, in each case based on the total mass of the LLDPE, wherein the alpha-olefin monomers are selected from the group consisting of 1-butene, 1-hexene, 1-octene, 1-decene and 1-dodecene and that LLDPE has a weight-average molecular weight (Mw) of 50,000 to 150,000 g/mol, a density of 0.90 to 0.95 g/cm$^3$ and has a crystallinity of 30 to 70%. A particularly suitable polyethylene is therefore an LLDPE which contains at least 85 wt. % of ethylene monomers and up to 15 wt. % of alpha-olefin monomers, in each case based on the total mass of the LLDPE, wherein the alpha-olefin monomers are selected from the group consisting of 1-hexene, 1-octene and 1-decene and that LLDPE has a weight-average molecular weight (Mw) of 69,000 to 100,000 g/mol, a density of 0.90 to 0.95 g/cm$^3$ and has a crystallinity of 30 to 70%. The most suitable is an LLDPE which contains at least 90 wt. % of ethylene monomers and up to 10 wt. % of alpha-olefin monomers, in each case based on the total mass of the LLDPE, wherein the alpha-olefin monomers are selected from the group consisting of 1-hexene and 1-octene and that LLDPE has a weight-average molecular weight (Mw) of 69,000 to 100,000 g/mol, a density of 0.91 to 0.94 g/cm$^3$ and has a crystallinity of 35 to 60%.

Unless stated otherwise, it is further preferred that the layers (B) to (D) each have at least 35 wt. % of polyethylene, particularly preferably at least 50 wt. % of polyethylene, very particularly preferably at least 70 wt. % of polyethylene and most preferably contain at least 90 wt. % of polyethylene, each based on the total mass of the layer. Layers (B) to (D) can, however, also comprise polymers other than polyethylene, insofar as the layers or the materials for their production can still be oriented as a whole.

Layers (B) to (D) of the foil according to the invention form a biaxially oriented polyethylene foil. The longitudinal direction is the direction in which the foil was originally extruded (machine direction) and is generally also abbreviated to MD. The transverse direction is perpendicular thereto and is generally also abbreviated to TD. The thickness is the third dimension. Biaxially oriented polyethylene foils have better mechanical properties and better optical properties than blown foils.

The thickness of the foil according to the invention is usually in a range from 3 to 50 μm, preferably in a range from 5 to 40 μm, particularly preferably in a range from 10 to 30 μm. Foils having small thicknesses are inexpensive and light. If the thickness is too small, the mechanical properties and thus also the processability are insufficient. If it is too high, the processability during production and further processing is also insufficient.

Layer (A)

The foil according to the invention is characterised in that it has a polyurethane layer, i.e. layer (A). The polyurethane layer (A) has a strong diffusion-inhibiting effect, which contributes to a significant improvement in the oxygen barrier properties and the water vapour barrier properties of the entire foil. In addition, layer (A) primarily serves to allow a highly durable coating of the foil according to the invention with metals and metal oxides.

Layer (A) has a favourable and precisely adjustable surface roughness, which is caused on the one hand by the very smooth surface of layer (A) and also by the nanoparticles in layer (A). The very smooth surface of layer (A) allows a very strongly adhering coating for metals such as aluminium or for metal oxides such as aluminium oxide or silicon dioxide. Because of the small size of the nanoparticles, they do not hinder a firm bond between the metal layer or metal oxide layer (M) and layer (A). Furthermore, the nanoparticles cause fewer defects in the metal layer or metal oxide layer than blocking agents. On the other hand, the nanoparticles impart a sufficient surface roughness to the surface of layer (A) and thus generate friction which makes it possible to transport the foil effectively in the production process by rolling and to wind and unwind it. Layer (A) also has a very high and very homogeneously distributed surface tension and, due to its chemical nature, is much better suited for subsequent coating with metals or metal oxides than polyethylene layers, which also clearly improves the adhesion of metal layers or metal oxide layers applied thereon (M). This applies in particular to the metal layers (M) made of aluminium on the surface of layer (A). The penetration depth of vapour-deposited aluminium atoms is much higher than that of the non-coated foil (without layer (A)).

Furthermore, a surface treatment (for example corona, plasma or flame treatment) downstream of the production process and in particular the stretching process is no longer necessary. This treatment is usually mandatory for a BOPE foil having a polyethylene outer layer to allow coating with metals or metal oxides. Functional groups are created on the non-polar surface of the polyethylene, which increases the surface tension and improves the adhesion. This usually happens between stretching and winding up the foil. The effect wears off after a certain time and may have to be renewed before further processing. This means that after a few weeks of storage, the surface tension drops below a threshold value and must be renewed. This is not necessary in the case of the foil according to the invention, since the inline coating with polyurethane, in comparison with the normally subsequent surface treatment, which can be, for example, a corona, plasma or flame treatment, ensures a permanent increase in the surface tension and does not need to be refreshed. This represents a great commercial advantage of the present foils because they can be stored permanently. Not only is this very positive in terms of process technology, it also saves a lot of time.

Layer (A) has a layer thickness in the range from 25 to 300 nm; this is preferably in the range from 50 to 250 nm and particularly preferably in the range from 50 to 150 nm. Layer (A) preferably has a layer thickness in the range from 0.1 to 5%, preferably in the range from 0.2 to 3% and particularly preferably in the range from 0.5 to 1% of the thickness of the foil according to the invention. Polyurethane is relatively expensive compared to polyethylene. A small layer thickness therefore results in lower costs. However, if the layer is smaller than that specified here, the formation of a homogeneous layer (A) on the film is made more difficult. In addition, layer (A) gradually loses its barrier properties. A high layer thickness, on the other hand, results in higher costs, but also in better barrier properties. Very large thicknesses can no longer be applied in an inline method (see below) and therefore increase the costs disproportionately.

Commercially available polyurethane dispersions are suitable as the material for the polyurethane. Takelac WPB 341 is particularly suitable. It is an aqueous dispersion from Mitsui Chemicals having 30% polyurethane content. Layer (A) can in principle also be applied by other methods, but may lose the advantages that it is thin, has a very uniform thickness and is very smooth. It may then also no longer be possible to produce the layer by inline coating. However, this simple production method represents a significant advantage of the present invention (see below)

The nanoparticles of layer (A) preferably contain nanoparticles made of amorphous silicon dioxide. The nanoparticles particularly preferably contain those made of colloidal silicon dioxide. However, other nanoparticles are also suitable. The particles are preferably used in colloidal form as dispersions. Nanoparticles, which are added to the polyurethane in dry form, are more prone to agglomeration and sedimentation than colloidal dispersions. This is undesirable. Spherical particles are preferably used. The average particle size of the nanoparticles of layer (A) which is determined by particle size analysis by laser diffraction is preferably not more than 20%, particularly preferably not more than 10% and most preferably not at all greater than the thickness of layer (A). Larger particles, such as antiblocking particles, would protrude too far out of the layer and possibly cause defects and in particular pinholes in any applied metal layer or metal oxide layer (M), which could impair the barrier properties. The average particle size of the nanoparticles in layer (A) is preferably in the range from 20 to 300 nm, particularly preferably in the range from 20 to 150 nm, very particularly preferably in the range from 50 to 150 nm and most preferably in the range from 80 to 150 nm. If the nanoparticles are too small, they have no effect and the foil would be too smooth. Processing would be impossible or not possible to a sufficient extent. If the nanoparticles are too large, the nanoparticles could protrude beyond layer A and thus damage any coating with metals or metal oxides. The foils would be permeable to water and air.

Furthermore, the nanoparticles in layer (A) preferably have a specific BET surface area in the range from 10 to 500 m$^2$/g, particularly preferably in the range from 10 to 150 m$^2$/g, very particularly preferably in the range from 10 to 100 m$^2$/g and most preferably in the range of 20 to 70 m$^2$/g. This allows a good connection of the nanoparticles to the polyurethane. Akasonobel's Levasil 30/50 nanoparticles are particularly suitable. It is a dispersion of colloidal silicon dioxide in water.

Layer (A) preferably contains the nanoparticles in an amount in the range from 0.5 to 30 wt. %, particularly preferably in the range from 0.5 to 20 wt. % and very particularly preferably in the range from 1 to 10 wt. % and most preferably in the range of 2 to 7 wt. %. The amount of nanoparticles allows the surface roughness to be adjusted. This results in a particularly good adhesion of metal layers or metal oxide layers (M) to layer (A) and facilitates the winding and unwinding of the foil from rolls at high processing speeds.

Layer (B)

In order to improve the connection of the polyurethane layer (A) to the foil, layer (B), which is a type of adhesive layer, comprises polymers having functional groups which can form covalent bonds with polyurethane. These polymers are preferably polyethylene. They can also be other polymers, but layer (B) must then contain polyethylene in addition to these polymers. Layer (B) preferably contains at least 50 wt. % of polyethylene, very particularly preferably at least 70% of polyethylene and most preferably at least 90 wt. % of polyethylene, in each case based on the total mass of layer (B). The functional groups act as adhesion promoters. If layer B contains no or insufficient functional groups, layer A easily separates from layer B and the foil becomes unstable. The polyethylene contained in layer (B) is preferably the polymer contained in layer (B) having functional groups one and the same polymer. The use of polyethylene in layer (B) means that layers (B), (C) and (D) have similar properties during processing. Polyethylene is understood to mean polymers that are selected from the group consisting of HDPE, LDPE, LLDPE and their copolymers and block copolymers, but also copolymers of PP and PE can be used, as described above. Among them, LLDPE is most preferred as described above.

If blends are used in layer (B), other polyolefins can also be used in addition to polyethylenes. In addition to polyethylene, up to 30 wt. % of polypropylene can be used. Different types of polyethylene can also be used. LLDPE can thus be blended with other types of polyethylene. This can result in improved processability of the foils. In addition to the polyethylene, preference is given to using polymers which improve the adhesion of layer (A).

The functional groups are preferably selected from the group consisting of carboxylic acid anhydride groups, epoxy groups, carboxylic acid groups and carboxylic acid ester groups. The polymers of layer (B) can also comprise a plurality of different such functional groups, for example carboxylic anhydride groups and carboxylic ester groups. The polymers of layer (B) particularly preferably contain a functional group selected on the group consist of carboxylic acid anhydride groups and carboxylic acid groups. Carboxylic anhydride groups are very particularly preferred. Most preferably, the polymers of layer (B) contain maleic anhydride groups. Layer (B) preferably comprises a maleic anhydride-modified polyethylene. The layer particularly preferably consists thereof. It is very particularly preferably a polyethylene with grafted-on maleic anhydride groups and most preferably a polyethylene homopolymer with grafted-on maleic anhydride groups. Maleic anhydride groups result in particularly strong bonds between layer (A) and layer (B). Also preferred as a polymer having functional groups is ethylene acrylic acid (EAA). It is also preferred that layer (B) contains no further polymers in addition. A large amount of maleic anhydride-modified polymer contributes particularly strongly to the bond between layers (A) and (B). The degree of grafting of the polymer with grafted maleic anhydride groups is preferably in a range from 0.01 to 1%, particularly preferably in a range from 0.1 to 0.4%. This applies in particular to polyethylene homopolymers.

The maleic anhydride groups can also be introduced into the polymer, in particular into the polyethylene, by copolymerising copolymerisable derivatives of maleic anhydride, such as 2-vinyl-maleic anhydride.

Such modified polyethylenes are known and are sold, for example, by Mitsui Chemicals under the trade name Admer®. For the purposes of the present invention, preference is given to ethylene homopolymers or ethylene copolymers which have been modified with maleic anhydride and whose melt indexes are in the range from 1 to 10 g/10 min at 230° C. (ASTM D 1238), particularly preferably in the range from 1 to 6 g/10 min. The Vicat softening point of the ethylene homopolymers or ethylene copolymers is likewise preferably in the range from 60 to 110° C., particularly preferably in the range from 80 to 110° C. (ASTM D 1525). It is also preferred that the melting point of the ethylene homopolymers or ethylene copolymers is in the range from 80 to 125° C., particularly preferably in the range from 100 to 125° C. and most preferably in the range from 110 to 125° C. The grafted maleic anhydride groups increase the polarity on the surface of layer (B) and allow a chemical connection to the components of the polyurethane layer (A).

The maleic anhydride-modified polyethylenes are preferably linear polyethylenes (LLDPE). The density is preferably 0.90 to 0.94 g/ml. Particularly preferred are the modified maleic anhydride polyethylenes with the trade names ADMER™ NF-408E, NF-377E and AT2539E (available from Mitsui Chemicals GmbH, Germany). The special composition of the material gives them a very high gloss. The resulting surface of layer (B) is very well suited for coating with layer (A) (in particular after MD stretching, see below) due to the low surface roughness and the increased surface tension and results in sufficient adhesion of layer (A) on layer (B).

Layer (B) preferably comprises at least 50 wt. %, particularly preferably at least 80 wt. %, very particularly preferably at least 95 wt. % and most preferably 100 wt. % of maleic anhydride-modified polyethylene.

It is also very particularly preferred that layer (B) contains no antiblocking agents. Antiblocking agents could greatly increase the surface roughness of layer (B) and worsen the connection of the polyurethane layer. Above all, however, such antiblocking agents can cause unevenness in the surface of the very thin layer (A), and thus also cause defects and in particular pinholes in any metal layer or metal oxide layer applied thereon. The barrier properties for oxygen and/or water vapour can deteriorate as a result.

The thickness of layer (B) is generally in the range from 0.3-5 µm, preferably in the range from 0.3-3 µm, in particular in the range from 0.5 to 2 µm. It is preferred that layer (B) has at most a layer thickness of 25% and preferably at most 15% of the thickness of the foil. In the case of a 25 µm thick foil according to the invention, the thickness of this layer is ideally about 1 to 2 µm.

Layer (C)

Layer (C) is the main layer (also called base layer or support layer). It is particularly important for the mechanical properties of the foil according to the invention. Due to the biaxial orientation of this layer and the layer thickness, it also contributes significantly to the barrier properties and the optical properties.

Layer (C) preferably has at least a layer thickness of 50%, preferably at least 70% and particularly preferably at least 80% of the thickness of the foil. In particular, the thickness of layer (C) is preferably in the range from 3 µm to 45 µm, particularly preferably in the range from 5 µm to 28 µm and most preferably in the range from 7 µm to 20 µm. In the case of a 25 µm thick foil according to the invention, the thickness of this layer is ideally approximately 22 µm.

Such foils are well known to a person skilled in the art. Layer (C) preferably comprises a polyethylene homopolymer. It is further preferred that layer (C) comprises more than 50 wt. %, preferably more than 80 wt. % and particularly preferably more than 90 wt. % of polyethylene. Most preferably it is made of polyethylene homopolymer.

Layer (D)

Layer (D) serves to impart a favourable surface texture and in particular a sufficient surface roughness to the side of the foil facing away from layer (A), so that the foil according to the invention can be transported over rollers and unwound from rolls at high speeds. It is therefore a common "skin layer" of polyethylene foils. Layer (D) preferably contains a polyethylene homopolymer. However, the layer can also contain a polyethylene copolymer.

The amount of antiblocking agent contained in layer (D) is generally in the range from 1 to 10 wt. %, preferably in the range from 1 to 7 wt. % and particularly preferably in the range from 1 to 6 wt. %. If the quantities are too small, the surface is too smooth and the foil cannot be processed well, and in particular cannot be wound up and unwound well. If the amount is too large, too many particles protrude from the surface of the foil. If a foil coated with metal on the opposite side is then wound up, these particles come into contact with the metal layer. They can then press into the metal layer (or metal oxide layer) and cause defects, in particular pinholes, which reduce the barrier properties. Therefore, an amount should be used that is as small as possible, but still allows processing. A suitable amount can easily be determined for each foil by preliminary tests. All known antiblocking agents can be used. What has been said for layer (B) applies accordingly to the thickness of layer (D).

The foil according to the invention can have further layers which can lie between layer (C) and the layers (B) and (D).

In addition, depending on the intended use of the foil, all the layers can contain various customary additives, which can be selected, for example, from the group consisting of mineral or organic additives to form microcavities, fillers, absorbents, UV and light protection agents, dyes and covering pigments.

For use in or as food packaging, polyethylene foils are often provided with a metal layer or metal oxide layer on at least one side. The present invention therefore also relates to a foil according to the invention which has a metal layer or a metal oxide layer which is connected directly to the surface of layer (A). Such foils can be used directly for food packaging.

A commercially available BOPE foil having a thickness of 18 µm, which only has layers (B), (C) and (D) in this order, has an oxygen transmission rate (OTR) from approx. 2000 to 4000 $cm^3/m^2*d$. This value can be reduced to about 200 to 300 $cm^3/m^2*d$ by standard metallisation. In comparison to such benchmark foils, the OTR value of the metallised foil according to the invention can be reduced cost-effectively to 20 to 80 $cm^3/m^2*d$ by the measures according to the invention (see also Table 1 and FIG. 3). This means that the use of a coating (layer (A)) which is only 100 nm thick reduces the oxygen transmission rate of the BOPE foils according to the invention by a factor of about 10 in comparison to currently available BOPE foils.

The same applies to the water vapour transmission rate. A commercially available BOPE foil having a thickness of 18 µm, which only has layers (B), (C) and (D) in this order, has a water vapour transmission rate (WVTR) of approx. 1 up to 2 $g/m^2d$. This value is only relatively slightly influenced by a standard metallisation and is about 1 to 1.5 $g/m^2d$ reduce. In comparison to such benchmark foils, the WVTR value of the metallised foil according to the invention can be reduced cost-effectively to below 0.5 $g/m^2d$ by the measures according to the invention (see also Table 1 and FIG. 3).

Foils according to the invention which have an oxygen transmission rate in the range from 30 to 70 $cm^3/m^2*d$ are preferred. Furthermore, foils according to the invention are preferred which have a water vapour transmission rate of 0.1 to 0.5 $g/m^2*d$.

Methods for metallising plastics material foils are known to a person skilled in the art. In principle, they can be carried out by vacuum metallisation, indirect metallisation, for example by hot foil stamping, plating and painting. Vacuum metallisation is preferred since it does not require any special properties or preparations of the foils and requires no or almost no auxiliary substances. Vacuum metallisation can be carried out either by physical vapour deposition or by sputtering (plasma enhanced chemical vapour deposition, PE-CVD). When using aluminium, physical vapour deposition is advantageously used. Metal oxide layers can also be applied using known methods. If the foil according to the invention has a metal oxide layer, it is preferably an aluminium oxide layer or a silicon dioxide layer which is connected directly to the surface of layer (A). The thickness of the layers differ depending on the material. Layer thicknesses in the range from 30 to 80 nm are preferred for aluminium layers, particularly preferred are 40 to 60 nm and most preferably 40 to 50 nm. Layer thicknesses of 30 to 80 nm are preferred for silicon oxide layers and 10 to 20 nm for aluminium oxide layers.

A foil according to the invention having a thickness in the range from 5 to 50 μm is particularly suitable, wherein layer (A) has a layer thickness in the range from 50 to 250 nm, layers (B) and (D) each independently of one another have a layer thickness in the range from 0.3-5 μm and layer (C) has a layer thickness in the range of 3 μm to 45 μm.

Another aspect of the present invention is a food packaging comprising a foil according to the invention.

Another aspect of the present invention is a method for producing a foil according to the invention, comprising the steps:
  providing a film which is monoaxially stretched in the longitudinal direction, comprises layers (B) to (D) which have a composition as described above, and wherein layers (B) and (D) are outer layers of the film,
  applying a layer of a liquid dispersion containing polyurethane and nanoparticles to layer (B),
  drying the liquid dispersion to produce layer (A),
  stretching the film in the transverse direction to produce a biaxially oriented foil.

This method therefore comprises sequential stretching. This method for producing a foil according to the invention preferably comprises the steps:
  providing at least the polymers for layers (B), (C) and (D), having a composition as described above, with all constituents,
  melting the individual polymers,
  extruding the polymers from a wide-slot nozzle to produce a film having at least three layers corresponding to layers (B), (C) and (D), layers (B) and (D) being outer layers of the film,
  cooling the resulting film on a cooling roller to produce a film having layers (B), (C) and (D),
  stretching the film in the longitudinal direction,
  applying a homogeneous layer of a liquid dispersion containing at least polyurethane and nanoparticles to layer (B),
  drying the liquid dispersion by means of heating to produce layer (A),
  stretching the film in the transverse direction to produce a biaxially oriented foil.

In a conventional method for the production of biaxially oriented polyethylene foils, a polyethylene starting material is provided, this is melted and a cast film (primary film) is produced from the melt by extrusion and cooling of the melt. The cast film is then rewarmed to stretch temperature and stretched biaxially in the machine direction (MD) and transverse direction (TD), either sequentially or simultaneously, and the stretched biaxially oriented polyethylene foil is wound up after cooling. In sequential stretching, the cast film is stretched first in the machine direction (MD) and then in the transverse direction (TD). After stretching in the longitudinal direction, the film usually has a thickness in the range from 200 to 500 μm. In the case of simultaneous stretching, the cast film is stretched simultaneously in both directions.

In the present description, biaxially oriented polyethylene foils are referred to as foils, while non-oriented or monoaxially oriented polyethylene films are referred to as films. However, this is not strictly followed. The terms "film" and "foil" are to be understood as synonyms in the sense of the present invention.

In comparison to the conventional production method, layer (A) is additionally applied in the method according to the invention. Applying the polyurethane in the form of a dispersion to the film after stretching in the longitudinal direction, but before stretching in the transverse direction, leads to a very simple method which hardly involves any additional effort compared to the production process for conventional foils. No additional extruder has to be used for the polyurethane layer. Since films for stretching are heated to near their softening point, removal of the solvent from the dispersion of the polyurethane can be done automatically by evaporation when the film is heated for stretching in the transverse direction. Since layer (A) is very thin, the time required for the evaporation of the solvent is very short. At the same time, the nanoparticles as constituents of a liquid dispersion are distributed evenly over the surface of layer (A) by the liquid. The polyurethane layer can therefore be applied inline, for example in a conveyor, by coating and the effort is very low.

The polyurethane dispersion can, however, also be applied in the longitudinal direction before a stretching operation, as described in the following methods which are also according to the invention:

A method for producing a foil according to the invention, comprising the steps:
  providing a film comprising layers (B) to (D), which have a composition as described above, in which the layers (B) to (D) are not oriented (primary film) and layers (B) and (D) are outer layers of the film,
  applying a liquid dispersion containing polyurethane and nanoparticles to layer (B),
  drying the liquid dispersion by means of heating to produce layer (A),
  simultaneously stretching the film in the longitudinal direction and in the transverse direction to produce a biaxially oriented foil.

The above method for producing a foil according to the invention is preferred, comprising the steps:
  providing at least the polymers for layers (B), (C) and (D), having a composition as described above, with all constituents,
  melting the individual polymers,
  extruding the polymers from a wide-slot nozzle to produce a film having at least three layers corresponding to layers (B), (C) and (D), layers (B) and (D) being outer layers,
  cooling the resulting film on a cooling roller to produce a film having layers (B), (C) and (D),
  applying a liquid dispersion containing at least a polyurethane and nanoparticles to layer (B),
  drying the liquid dispersion by means of heating to produce layer (A),
  simultaneously stretching the film in the longitudinal direction and in the transverse direction to produce a biaxially oriented foil.

For example, single-screw extruders or twin-screw extruders can be used for melting and extruding the polymers.

In a third version of the method according to the invention, a combination of the above methods according to the invention is used. The film is first stretched in the longitudinal direction, then the liquid dispersion is applied and then simultaneously stretched again.

However, the method specified first is preferred, in which sequential stretching is used, since less liquid dispersion has to be applied than when simultaneous stretching is used. This speeds up the method and reduces costs.

In addition to the nanoparticles and the polyurethane, the dispersion also contains a solvent. The liquid dispersion preferably contains 0.5 to 20 wt. %, preferably 1 to 10 wt. % and particularly preferably 2 to 7 wt. %, of nanoparticles, based on the dry matter of the liquid dispersion. The dry matter is determined by drying the liquid dispersion to the constant weight at 130° C. The residue then represents the dry matter. The solvents used for the liquid dispersion in this method therefore preferably have a boiling point of 140° C. or less, particularly preferably 130° C. or less and very particularly preferably 120° C. or less and most preferably 100° C. or less.

The liquid dispersion typically contains 80 to 99.5 wt. %, preferably 90 to 99 wt. % and particularly preferably 93 to 96 wt. % of polyurethane, based on the dry matter of the liquid dispersion. In addition to polyurethane, the dry matter contains at least the nanoparticles and can also contain other auxiliary substances. Furthermore, the liquid dispersion typically contains 5 to 25 wt. %, preferably 10 to 20 wt. % and particularly preferably 12 to 18 wt. % of dry matter. The liquid dispersion is preferably an aqueous dispersion. Water is particularly preferably the only solvent used in the liquid dispersion. In addition, the dispersion can contain crosslinking agents. The crosslinking agents can make up up to 3 wt. %, preferably up to 1 wt. %, of the dry matter of the dispersion. The crosslinking agent is preferably a polyfunctional aziridine crosslinking agent.

The polyurethane dispersion Takelac WPB-341 from Mitsui Chemical is preferably used as the polyurethane. It is a specially modified polyurethane which, in contrast to conventional polyurethanes, has a significantly increased oxygen barrier. So far, the material has only been used in the offline coating sector to increase the gas barriers of solar cells or special packaging. The material has never been used before for the inline process with subsequent stretching. It is further preferred that nanoparticles Levasil 30/50 from Akzonobel are added in an amount of 3 to 5% to the polyurethane dispersion and in particular to the polyurethane dispersion Takelac WPB-341.

A method according to the invention is preferred in which the drying of the liquid dispersion takes place simultaneously with the stretching of the film in the transverse direction or in which the drying of the liquid dispersion takes place simultaneously with the preheating of the films for the simultaneous stretching of the films in the longitudinal and transverse directions. For stretching, polyethylene films are usually heated in the preheating zone of the stretching furnace to a temperature in the range from 120° C. to 135° C., preferably in the range from 125 to 130° C., in order to bring the film to stretching temperature in order to increase the stretchability thereof. By heating the film in the preheating zone, the dispersion thereon can be dried at the same time, as a result of which layer (A) is formed. An additional method step for drying the dispersion is therefore unnecessary. At these temperatures, the polymers contained in the various layers are heated sufficiently to bring them into a state favourable for stretching. Furthermore, the polyurethane layer (A) is fused into a uniform film at these temperatures, so that it does not tear during stretching. Finally, the temperature is still low enough that the polyethylene layer (B) does not become so thin that it separates from the adjacent layers.

The liquid dispersion is preferably applied to layer (B) using the reverse gravure kiss coating method and particularly preferably using a reverse gravure coater using kiss coating. FIG. 4 shows schematically how this method is carried out. The film is guided by two guide rolls over the engraving roller, which rotates against the direction of movement of the film. The printing roller is loaded with the aqueous dispersion (dotted) through a reservoir. This method allows the liquid dispersion to be applied evenly at very high processing speeds. The solids content of the liquid dispersion is preferably 5 to 20 wt. %, particularly preferably 10 to 20 wt. % and ideally 15 wt. %, in each case based on the total mass of the liquid dispersion. The wet layer formed by the liquid dispersion on layer (B) preferably has a mass of 3 to 20 g/m$^2$ and particularly preferably 6 to 10 g/m$^2$. The solids content of the liquid dispersion is very particularly preferably 10 to 20 wt. % and the wet layer formed therefrom has a mass of 6 to 10 g/m$^2$. When applying the liquid dispersion, the liquid dispersion preferably has a temperature of not more than 100° C., preferably not more than 70° C. and particularly preferably not more than 40° C. At high temperatures, the liquid can boil and/or the constituents can decompose. Typically, printing is done at room temperature and maintaining that temperature should not be a problem. However, if the foil is provided with layer (A) immediately after it has been produced, care must be taken to ensure that it is sufficiently cooled before applying layer (A).

It is further preferred that the surface of layer (B) is subjected to a surface treatment before applying the liquid dispersion. This surface treatment is preferably a surface treatment selected from the group consisting of corona treatment, plasma treatment and flame treatment. Corona treatment is most preferred. Such surface treatment of layer (B) improves the adhesion of layers (A) and (B) to one another. Since the degree of crystallisation of the film before stretching in the transverse direction is still relatively low, the pre-treatment by means of corona treatment, plasma treatment and flame treatment is more effective than with conventional films which are treated after the transverse stretching. The amount of polyurethane dispersion is also many times smaller when it is applied before the transverse stretching. With a film width of typically 30 cm to 1.5 m after the longitudinal stretching, the foil width is typically 8-11 m after transverse stretching. A much larger amount of liquid dispersion would therefore have to be applied in order to achieve a uniform coating.

A method according to the invention is also preferred, characterised in that the cooling roller has a temperature in the range from 20 to 40° C.

A conventional stretching furnace which has at least one preheating zone is preferably used for transverse stretching. In the present method, the preheating temperature in the preheating zone of the stretching furnace must be set so that the polyurethane dispersion substantially dries and melts into a uniform layer before the actual stretching begins. For this purpose, the preheating temperature may have to be set higher than is usually the case. The preheating temperature is preferably 2 to 15° C. and particularly preferably 3 to 10° C. higher. If the liquid dispersion has not dried sufficiently before stretching, layer (A) may have defects and in particular pinholes. If the surface tension is uniformly high over the entire surface of layer (A), the coating is homogeneous. Correspondingly, the oxygen transmission rate or the water vapour transmission rate can also be used as a measure of the sufficient drying and melting. If longer drying or if drying at a higher temperature does not improve these values, the drying temperature is sufficient for this film and this production method.

It is further preferred that the stretching ratio for sequential stretching in the longitudinal direction is in the range from 2 to 8, preferably in the range from 3 to 7 and particularly preferably in the range from 4 to 6. The stretching ratio in the transverse direction in the case of sequential stretching is preferably in the range from 4 to 10, particularly preferably in the range from 6 to 10 and very particularly preferably in the range from 6 to 9. In the method with simultaneous stretching, the stretching rate is preferably 35 to 60, particularly preferably 40 to 55 and very particularly preferably 40 to 50. It is also advantageous if the application of the melt to the cooling roller is supported by a so-called air knife.

After stretching, the foil can furthermore be relaxed in the longitudinal direction or in the transverse direction or in both directions.

EXAMPLES

Figure 1:
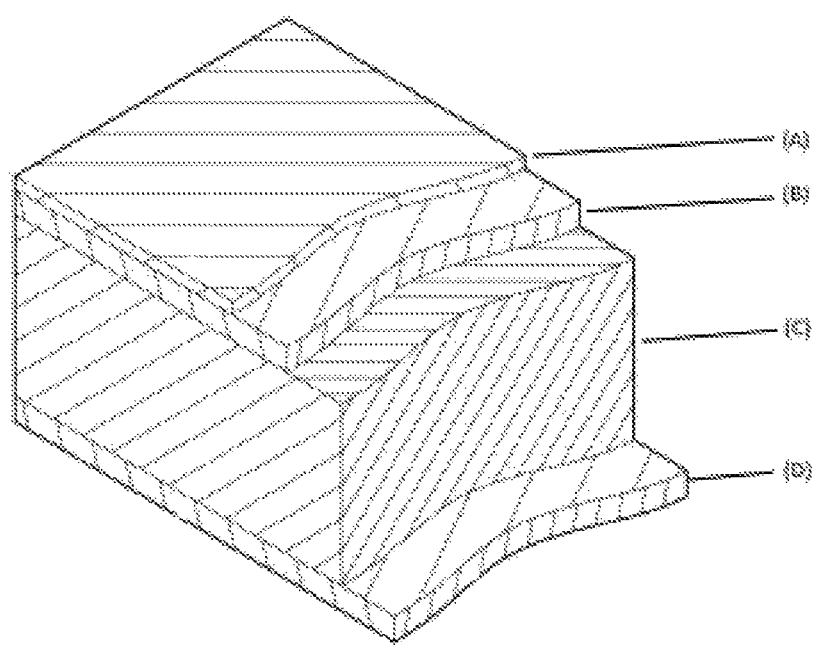
FIG. 1 shows the structure of the foils according to the invention having layers (A) to (D).

Materials:

Takelac WPB 341 is an aqueous dispersion from Mitsui Chemicals having 30% polyurethane content. Levasil CT3 PL (also called "PL Levasil 30/50") is an aqueous dispersion of colloidal silicon dioxide from Akzonobel having a colloidal silicon dioxide content of 50 wt. % (particle size 80-100 nm; spec. surface 35 m²/g; BET surface: 40 m²/g). Admer NF-408E is a polyethylene homopolymer with grafted maleic anhydride groups having an MFR of 3 g/10 min at 190° C. and a weight of 2.16 kg (ASTM D 1238), a density of 0.92 g/cm³, a Vicat softening temperature of 100° C. (D1525) and a melting point of 120° C. "Constab AB 06001 LD" is a low-density polyethylene having a proportion of 4 wt. % of a synthetic silicon dioxide based on the total weight of the "Constab AB 06001 LD". The particles of silicon dioxide have a particle size of 4 μm. The product is available from "CONSTAB Polyolefin Additives GmbH", Ruthen, Germany.

Particle sizes are preferably measured by particle size analysis by laser diffraction.

Example 1

To produce a foil according to the invention, an LLDPE are mixed with an MFR of 2.1 g/10 min at 190° C. (ISO 1133), a density of 0.92 g/cm³ (ASTM D1505) and a melting point of 126° C. and 5 wt. % "Constab AB 06001 LD" based on the weight of the mixture. LLDPE with an MFR of 2.1 (ISO 1133), a density of 0.92 g/cm³ (ASTM D1505) and a melting point of 126° C. for layer (C) and the above mixture for layer (D) are melted separately in an extruder at 220 to 250° C. Admer NF-408E is melted for layer (B) at a temperature of 220-250° C. The aforementioned materials are extruded using a wide-slot nozzle. Layers (B) to (D) are each extruded separately using a twin-screw extruder. The melt extruded through the wide-slot nozzle is cooled with the aid of a cooling roll and a cast film is thus obtained. This cast film is stretched at a film speed of 10 m/min in a stretching system in the longitudinal direction with a stretching ratio of 5. The preheating rollers have temperatures in the range of 60 to 92° C., the stretching roller temperatures range from 95 to 105° C. and the annealing roller temperatures range from 78 to 105° C.

After stretching in the longitudinal direction, the film has a speed of 50 m/min. After cooling the resulting monoaxially oriented film (MOPE film), the surface of layer (B) of the film is first subjected to a conventional corona treatment.

The wetting of the film surface is improved by means of the polyurethane. An aqueous polyurethane dispersion is subsequently applied to layer (B) as a coating material by means of reverse gravure kiss coating with the aid of a reverse gravure coater on the MOPE film. For this, engraved rollers are used which have depressions which are filled with the dispersion with each revolution. When it comes into contact with the film web, part of the liquid is transferred to the film. By rotating the roller counter to the direction of motion of the film, a uniform wetting area is created on the film web. A 12 g/m² engraving roller is used, which produces a wet layer with 12 g aqueous dispersion per square metre of film surface. The dispersion used for coating consists of 48 wt. % of Takelac WPB 341, 1.2 wt. % of Levasil 30/50 and 50.8 wt. % of water, in each case based on the total mass of the dispersion.

The film is subsequently stretched in a transverse direction in a stretching furnace using a stretching ratio of 8.5, the preheating zone having an air temperature in the range from 144 to 160° C. and so when preheating in the stretching oven the aqueous polyurethane dispersion is dried before stretching to form a polyurethane layer (A). The stretching zones have temperatures of 138 to 156° C. and the annealing zone has a temperature in the range of 128 to 138° C. All temperatures given here are the temperature of the air in the corresponding zones of the stretching furnace. The foil is subsequently metallised in a further offline method. Aluminum is used as the metal, which is applied using physical vapour deposition (PVD). The layer thickness is 45 nm and the optical density of the layer is 2.5.

A foil with the following properties is obtained:

Layer thicknesses: Overall film 20 μm (according to DIN 53370), layer (A) 100 nm, layers (B) and (D) 1 μm, layer (C) 18 μm, metal layer (M) 45 nm; tensile strength (ASTM D 882) MD: 62 N/mm², TD: 204 N/mm²; elongation at break (ASTM D 882) MD: 430%, TD: 56%; modulus of elasticity (ASTM D 882) MD: 280 N/mm², TD: 444 N/mm²; friction coefficient (DIN EN ISO 8295, U/U) MD: 0.58 μS, TD: 0.53 μk; heat shrink (BMS TT 0.2; 100° C./10 min) MD: 3.9%, TD 3.6%; oxygen transmission rate (ISO 15105-2) <13 cm³/(m²dbar) (at 23° C. and 0% relative humidity); water transmission rate (ASTM E 96) 0.8 g/(m²d) (at 38° C. and 90% relative humidity); metal adhesion (tape test, TP-104-

87) 5/5, (EAA sealing, AIMCAL process TP-105-92 for the adhesion of metallised films, N/15 mm)>5, no detachment of the metal.

As can be seen from these values, the mechanical properties of the foils according to the invention are similar to those of the commercially available barrier foils. However, the oxygen transmission rate and the water vapour transmission rate are greatly reduced. When used, this results in an extended shelf life of the food packaged with it.

Figure 2A:
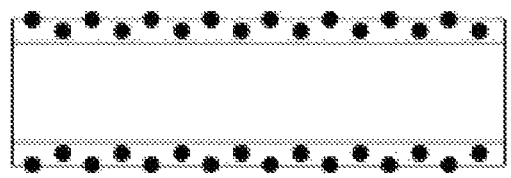
FIG. 2A shows the structure of a conventional polyethylene foil again with a base layer and two outer layers (skin layer), one of which contains antiblocking agents.
Figure 2B:
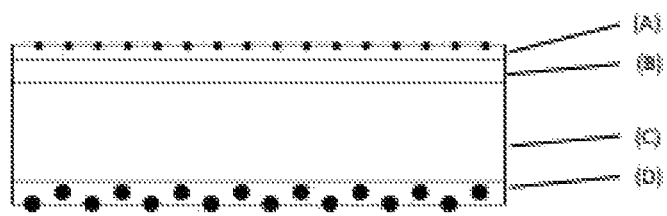
FIG. 2B shows the structure of a foil according to the invention, with the additional layer (A), which contains nanoparticles. The particles in the layers are marked.
Figure 3:
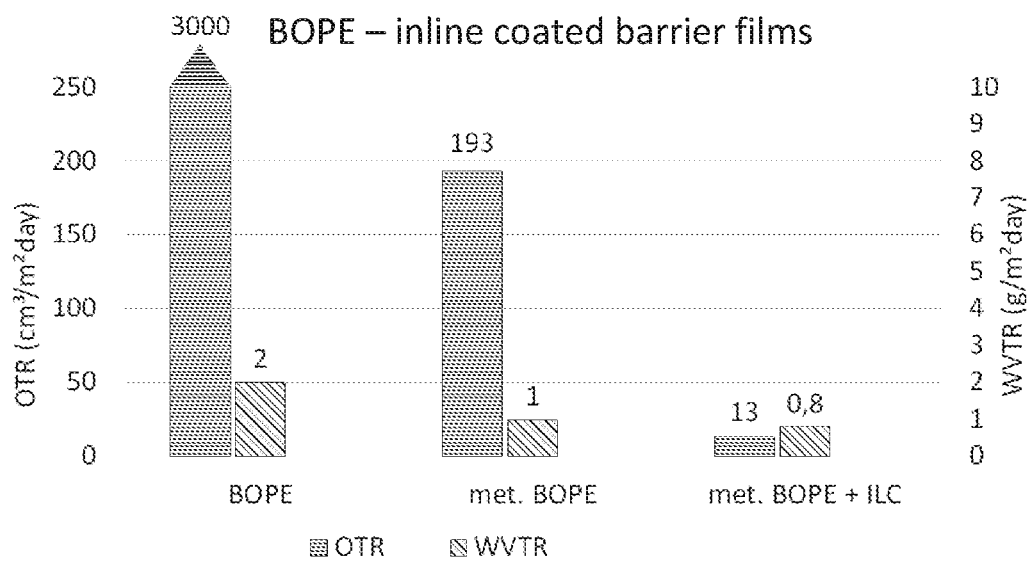
FIG. 3 shows a comparison of the oxygen and water vapour barrier properties of conventional polyethylene foils (BOPE), metallised BOPE foils (met. BOPE) and foils according to the invention with inline-generated polyurethane coating and offline-generated metal layer having particularly good barrier properties (met. BOPE+ILC). The leftmost column is shown in abbreviated form (see Table 1).
Figure 4:
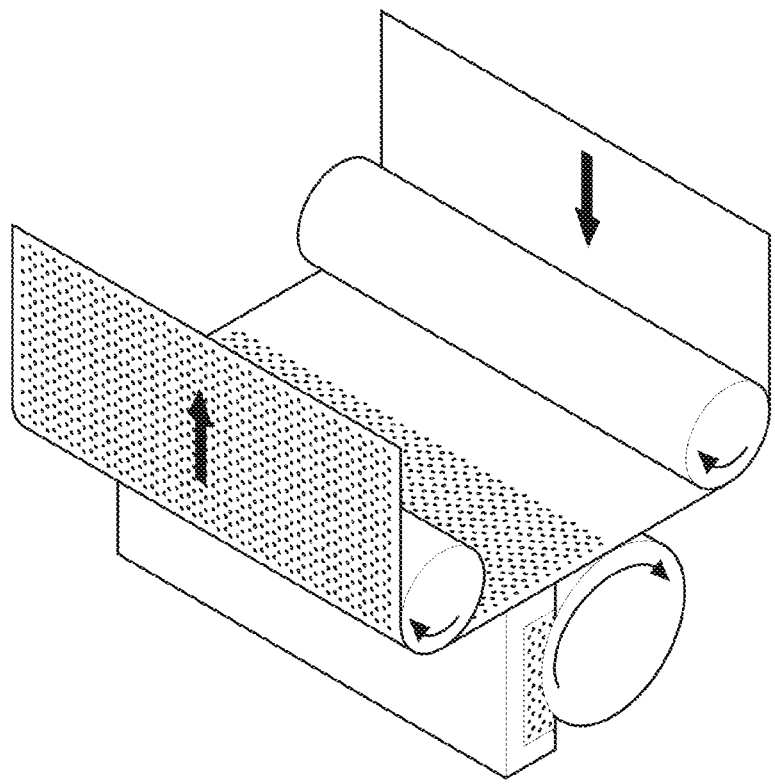
FIG. 4 is a schematic representation of a reverse gravure kiss coating process as used in the present method. The dotted regions on the foil show the part of the foil coated on one side. The liquid dispersion in the reservoir is also shown as dots.

FIG. 3 shows the oxygen transmission rate (OTR) and the water vapour transmission rate (WVTR) for a metallised foil according to example 1 (met. BOPE+ILC, metallised biaxially oriented polyethylene foil with inline coating, far right), for a commercially available non-metallised biaxially oriented polyethylene foil of the same thickness (BOPE, far left, the leftmost column is shown in abbreviated form (see Table 1, see also FIG. 2A for a schematic representation of this foil) and for the same foil with metallisation (met. BOPE, in the centre). As can be seen, the oxygen transmission rate is again dramatically reduced by the foil according to the invention compared to the commercially available metallised BOPE foil, without a great deal of additional effort being involved in the production. The oxygen transmission rate is reduced by a factor of more than 10. The water vapour transmission rate is also reduced.

Table 1 shows the numerical data of the foils:

|  | Oxygen transmission rate [$cm^3/m^2*day$] | Water vapour transmission rate [$g/m^2*day$] |
| --- | --- | --- |
| BOPE | 3000* | 2 |
| met. BOPE | 193 | 1 |
| met. BOPE + ILC | 13 | 0.8 |

*shown in abbreviated form in FIG. 3.

The metal adhesion is also extremely high and almost unique for a metallised biaxially oriented polypropylene film.

The invention claimed is:

1. A method for producing a polyethylene foil comprising 4 layers (A) to (D) arranged in the order of (A) to (D), wherein layers (B) to (D) comprise biaxially oriented polyethylene and wherein layer (A) comprises polyurethane and nanoparticles and has a layer thickness of 25 to 300 nm, layer (B) comprises polymers having functional groups, which can form covalent bonds with polyurethane and is directly connected to layer (A), layer (C) has at least a layer thickness of 50% of the total thickness of the foil, and layer (D) represents an outer layer of the foil and comprises antiblocking agents, the method comprising the steps of:

providing a film which is monoaxially stretched in the longitudinal direction, comprises layers (B) to (D) which have a composition, and wherein layers (B) and (D) are outer layers of the film, applying a layer of a liquid dispersion containing polyurethane and nanoparticles to layer (B), drying the liquid dispersion to produce layer (A), stretching the film in the transverse direction to produce a biaxially oriented foil.

2. The method of claim 1, further comprising:

providing a film comprising layers (B) to (D), which have a composition, in which the layers (B) to (D) are not oriented and layers (B) and (D) are outer layers of the film, applying a liquid dispersion containing polyurethane and nanoparticles to layer (B), drying the liquid dispersion by means of heating to produce layer (A), simultaneously stretching the film in the longitudinal direction and in the transverse direction to produce a biaxially oriented foil.

3. The method according to claim 1, wherein before applying the liquid dispersion, the surface of layer (B) is subjected to a surface treatment.

4. The method according to claim 1, wherein the liquid dispersion is applied to layer (B) via inline coating.

5. The method according to claim 1, wherein a wet layer formed by the liquid dispersion on layer (B) has a mass of 3 to 20 $g/m^2$.

6. The method according to claim 1, wherein the liquid dispersion is an aqueous dispersion.

7. The method according to claim 1, wherein the stretching ratio in the longitudinal direction is in the range of from 2 to 8.

8. The method according to claim 1, wherein the stretching ratio in the transverse direction is in the range of from 4 to 10.

9. The method according to claim 1, wherein before applying the liquid dispersion, the surface of layer (B) is subjected to a corona treatment.

10. The method according to claim 1, wherein the liquid dispersion is applied to layer (B) via inline coating using the reverse gravure kiss coating method.

11. The method according to claim 1, wherein a wet layer formed by the liquid dispersion on layer (B) has a mass of 6 to 10 $g/m^2$.

\* \* \* \* \*